Patented Apr. 9, 1935

1,996,745

UNITED STATES PATENT OFFICE 1,996,745

PREPARATION OF NAPHTHOLS

Edgar C. Britton and Horace A. Stearns, Midland, Mich., assignors to The Dow Chemical Company, Midland, Mich., a corporation of Michigan No Drawing. Application March 2, 1931, Serial No. 519,694

9 Claims. (Cl. 260—154)

The present invention concerns a method for the preparation of naphthols by the alkaline hydrolysis of halo-naphthalenes at an elevated temperature and pressure.

Heretofore it has been assumed that the hydrolysis of halogenated aromatic hydrocarbons proceeds to the formation of the corresponding hydroxy derivative. However, in the pending application of E. C. Britton, one of the present co-applicants, Serial No. 519,693, filed March 2, 1931, there is disclosed the fact that when a hydrocarbon-substituted aromatic halo-hydrocarbon, e. g. a chlorodiphenyl or chlorotoluene, is reacted under certain conditions, a product is obtained which comprises not only the expected phenol but also a phenol wherein the hydroxy group is in a position ortho or para to that occupied by the halogen in the starting material. We now have found that similar results are obtained in the alkaline hydrolysis of a bromo- or chloronaphthalene under similar conditions in the absence of copper and at temperatures between 300° and 400° C. to form a naphthol wherein hydrogen occupies the position originally filled by the halogen and the hydroxy group is ortho thereto, together with a certain amount of the expected naphthol wherein the hydroxy group has directly replaced the halogen. (We are aware that Meyer and Bergius (U. S. 1,062,351) have disclosed the formation of solely alpha-naphthol by the hydrolysis of alpha-chloronaphthalene at 280°–300° C.)

Such hydrolysis can be explained by the addition of water in a position either 1,2 or 1,4 to the halogen substituent in the nucleus (considering the halogen as being in position 1) followed by removal of hydrohalide acid therefrom to form, for instance, beta-naphthol, as well as alpha-naphthol, from alpha-chloronaphthalene. In the same way, a mixture of the same products, but in different proportions, may be formed from beta-chloronaphthalene. We have found that such naphthols cannot similarly be converted into isomers thereof by treating with alkalies in like manner, hence such reaction is to be considered as a reaction "in situ" and not as a rearrangement or migration.

Our invention, then, consists of the method and steps hereinafter fully described and particularly pointed out in the claims, the following description setting forth in detail certain preferred procedure for carrying out the principle of our invention.

In general, our invention may be carried out as follows:—Chloronaphthalene, as representing a halonaphthalene, is mixed with a moderate excess of aqueous sodium hydroxide solution of approximately 3 to 25 per cent strength, in proportion of about 1.5 to 5 mols of said base per one mol of chloronaphthalene, and the mixture heated under pressure, in the absence of catalytic copper, in a suitable apparatus, e. g. an autoclave, bomb, or tubular autoclave system, the surfaces thereof which contact with the reaction mixture being preferably constructed of a metal, e. g. iron, nickel, or equivalent thereof. The temperature of the reaction mixture is maintained between 300° and 400° C., preferably between 340° and 380° C., for approximately one or two hours, or longer if necessary to obtain the desired conversion. The so obtained reaction mixture is then treated in any suitable way to isolate and recover the separate constituents thereof. For instance, the cooled or hot reaction mixture may be extracted with a water-immiscible solvent such as carbon tetrachloride, ether, or equivalent thereof, to remove caustic-insoluble ethers, i. e. dinaphthyl ethers, which may then be recovered by distillation of the solvent. The aqueous residual solution may then be acidified with any suitable acid, e. g. hydrochloric or sulfuric acid, and the thereby precipitated naphthols separated from residual liquors and from each other in any suitable way, such as by fractional acidification of an alkaline solution thereof, by treatment of an aqueous alkaline solution thereof with a precipitant such as lime or calcium chloride, or in any other suitable way. According to another procedure, the reaction mixture may be acidified and the mixed solids, comprising naphthols together with dinaphthyl ethers, fractionally distilled to separate the ethers from the naphthols. The mixed naphthols may then be dissolved in aqueous sodium hydroxide solution, and calcium chloride solution added thereto, thereby precipitating a calcium salt of beta-naphthol, from which latter the free beta-naphthol can be recovered by acid treatment. The residual solution containing sodium alpha-naphtholate may also be treated with acid to precipitate the free alpha-naphthol.

The composition of the crude naphthol product varies somewhat, depending upon the conditions employed in the hydrolysis. For instance, the tendency to produce ethers from the formed naphthols is increased by the use of stronger alkaline solutions, by the use of a lesser amount of base of a given concentration, and also by the temperature.

The following examples serve to illustrate some of the various ways in which our invention may be used:—

Example 1

A mixture of 1 mol of monochloronaphthalene (consisting of 98.5 per cent alpha and 1.5 per cent beta-chloro isomers), and 2.5 mols of sodium hydroxide in 10 per cent aqueous solution was heated to a temperature of 350° to 360° C. in about one-half hour, and thereat maintained for one hour in an iron reactor, thereby obtaining a 96.5 per cent conversion. The aqueous reaction mixture was removed from the bomb, acidified with hydrochloric acid, and the crude naphthols together with ethers separated therefrom by filtration, and then fractionally distilled. The so obtained naphthol product consisted of about 56 per cent and 44 per cent of alpha and beta-naphthols, respectively. As a byproduct there was obtained 0.125 mol of dinaphthyl ether.

Example 2

As in the above example, 1 mol. of monochloronaphthalene (consisting of 77.5 per cent alpha and 22.5 per cent of beta modifications) was reacted with 1 kilogram of 9.85 per cent aqueous sodium hydroxide in an iron reactor for one hour at 350° to 360° C., obtaining thereby a practically quantitative conversion. The crude reaction product comprised 0.67 mol of naphthols (51 per cent and 49 per cent of alpha and beta modifications, respectively) and 0.15 mol of dinaphthyl ether.

Example 3

As above, 0.5 mol of pure beta-chloronaphthalene was reacted with 1.25 mols of aqueous 10 per cent sodium hydroxide for one hour at 350° to 360° C., thereby obtaining a 96 per cent conversion, and a naphthol product consisting of 78 per cent and 22 per cent of beta and alpha-naphthols, respectively.

Example 4

In like manner, alpha-chloronaphthalene (containing 8 per cent of the beta isomer) was hydrolyzed with aqueous sodium carbonate at 350°–360° C., obtaining thereby a practically quantitative conversion and a naphthol product containing approximately 60 per cent and 40 per cent, respectively, of alpha and beta-naphthols.

Example 5

Similarly, alpha-chloronaphthalene (containing 8 per cent of the beta modification) was hydrolyzed with aqueous sodium borate at 350°–360° C. The chloronaphthalene was hydrolyzed to about 90 per cent to form a crude product from which a naphthol product was obtained which contained approximately 49 per cent and 51 per cent, respectively, of alpha and beta-naphthols.

In brief, our invention concerns the preparation of naphthols by the hydrolysis of bromo or chloronaphthalene, or alkyl derivatives thereof, (the corresponding iodo compounds being excluded) to form a crude reaction product comprising a mixture of an unexpected naphthol wherein hydrogen occupies the original halogen position and the hydroxy group is ortho thereto, together with the expected naphthol, i. e. wherein the hydroxy group has directly replaced the halogen, such hydrolysis being carried out at temperatures between 300° and 400° C. in the presence of a hydrolytic agent from the group comprising an alkali-metal hydroxide, carbonate, or borate, or a mixture of two or more such agents, or equivalent thereof, and in the substantial absence of copper. In the copending application of E. C. Britton, Serial No. 519,692, filed March 2, 1931, it has been shown that there is no substantial formation of isomeric phenols in hydrolytic reactions of the character in hand when a copper-containing catalyst, particularly metallic copper, is present. It is essential, then, that copper be absent for accomplishing the substitution of hydroxyl in a position in the aromatic nucleus other than that occupied by the halogen originally, in order to carry out the process in accordance with the present invention.

The novel products obtainable by the herein described hydrolysis, e. g. a mixture of alpha- and beta-naphthols, with or without accompanying dinaphthyl ethers or mixed dinaphthyl ethers and in varying proportions (dependent on the conditions of the hydrolysis) may advantageously be employed as such without further unnecessary separation into individual components thereof for antiseptic, insecticidal, or other purposes.

In the claims, by the expression "in the absence of copper", we mean copper which is in a form capable of acting catalytically in the hydrolytic reaction, e. g. a copper inner-surface of the reactor, copper powder not in contact with a less noble metal such as iron, or a dissolved copper compound such as cuprous oxide.

Other modes of applying the principle of our invention may be employed instead of those explained, change being made as regards the details herein disclosed, provided the step or steps stated by any of the following claims or the equivalent thereof be employed.

We therefore particularly point out and distinctly claim as our invention:—

1. The method of making a mixture of alpha and beta-naphthols which comprises reacting a monochloronaphthalene with approximately 1.5 mols to 5 mols of aqueous sodium hydroxide of 3 to 25 per cent concentration, under pressure, at a temperature of 300° to 400° C., and in the absence of catalytically active metallic copper or copper compound.

2. The method of making alpha-naphthol which comprises reacting a mixture of alpha and beta-chloronaphthalenes with approximately 1.5 mols to 5 mols of aqueous sodium hydroxide of 3 to 25 per cent concentration, under pressure, at a temperature of 300° to 400° C., in the absence of catalytically active metallic copper or copper compound, and separating alpha-naphthol from the reaction mixture comprising alpha and beta-naphthols and naphthyl ethers.

3. The method of making beta-naphthol which comprises reacting a mixture of alpha and beta-chloronaphthalenes with approximately 1.5 mols to 5 mols of aqueous sodium hydroxide of 3 to 25 per cent concentration, under pressure, at a temperature of 300° to 400° C., in the absence of catalytically active metallic copper or copper compound, and separating beta-naphthol from the reaction mixture comprising alpha and beta-naphthols and naphthyl ethers.

4. The method of making alpha and beta-naphthols which comprises reacting a mixture of alpha and beta-chloronaphthalenes with approximately 1.5 mols to 5 mols of aqueous sodium hydroxide of 3 to 25 per cent concentration, under pressure, at a temperature of 300° to 400° C., in the absence of catalytically active metallic copper or copper compound, and separating alpha and beta-naphthols from the reaction mixture comprising alpha and beta-naphthols and naphthyl ethers, the alpha and beta-naphthols being formed in a different ratio than the ratio of the alpha and beta-chloronaphthalenes originally present.

5. The method of making a mixture of alpha- and beta-naphthols which comprises reacting a mono-halo-naphthalene with an aqueous hydrolytic base by heating under pressure at a temperature between 300° and 400° C. in the absence of a catalyst, the reactor surfaces in contact with the reaction mixture being composed substantially of metallic iron, whereby a portion of such mono-halo-naphthalene is converted to the corresponding naphthol and another portion thereof is converted to the isomeric modification thereof, and separating such isomeric naphthols from the product.

6. The method of making a mixture of alpha- and beta-naphthols which comprises reacting a mono-halo-naphthalene with an aqueous hydrolytic base by heating under pressure at a temperature between 300° and 400° C. in the absence of catalytically active metallic copper or copper compounds, whereby a portion of such mono-halo compound is converted to the corresponding naphthol and another portion thereof is converted to the isomeric modification thereof, and separating such isomeric naphthols from the product.

7. The method of making a mixture of alpha- and beta-naphthols which comprises reacting a mono-chloro-naphthalene by heating under pressure at a temperature between 300° and 400° C. with an aqueous hydrolytic agent from the class consisting of the alkali-metal hydroxides, carbonates and borates, in the absence of catalytically active metallic copper or copper compounds, whereby a portion of such mono-chloro compound is converted to the corresponding naphthol, and another portion thereof is converted to the isomeric modification thereof, and separating such isomeric naphthols from the product.

8. The method of making a mixture of alpha- and beta-naphthols which comprises reacting alpha-chloro-naphthalene by heating under pressure at a temperature between 300° and 400° C. with an aqueous hydrolytic agent selected from the group consisting of the alkali-metal hydroxides, carbonates and borates, in the absence of catalytically active metallic copper or copper compounds, whereby a portion of such alpha-chloro-naphthalene is converted to alpha-naphthol and another portion thereof is converted to the isomeric beta-naphthol, and separating such isomeric naphthols from the product.

9. The method of making a mixture of alpha- and beta-naphthols which comprises reacting beta-chloro-naphthalene by heating under pressure at a temperature between 300° and 400° C. with an aqueous hydrolytic agent selected from the group consisting of the alkali-metal hydroxides, carbonates and borates, in the absence of catalytically active metallic copper or copper compounds, whereby a portion of beta-chloro-naphthalene is converted to beta-naphthol and another portion thereof is converted to the isomeric alpha-naphthol, and separating such isomeric naphthols from the product.

EDGAR C. BRITTON.
HORACE A. STEARNS.